No. 657,227. Patented Sept. 4, 1900.
R. F. STEWART.
BUTTER CUTTER.
(Application filed Nov. 22, 1899.)
(No Model.) 2 Sheets—Sheet 1.
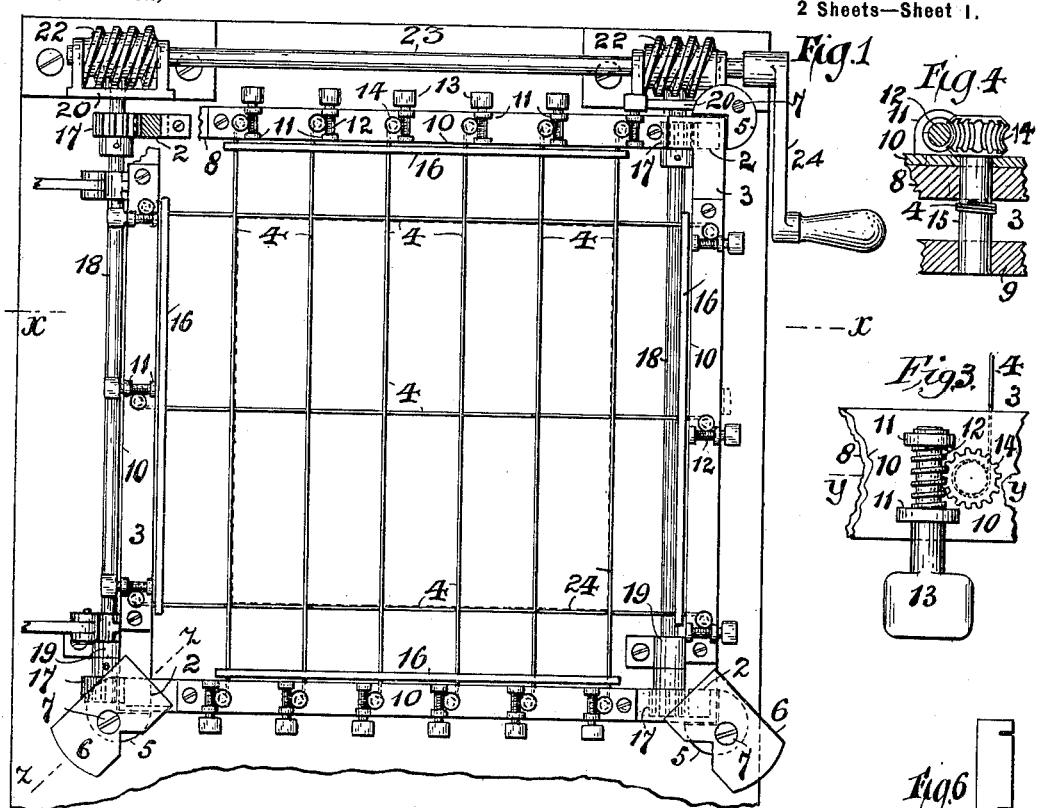
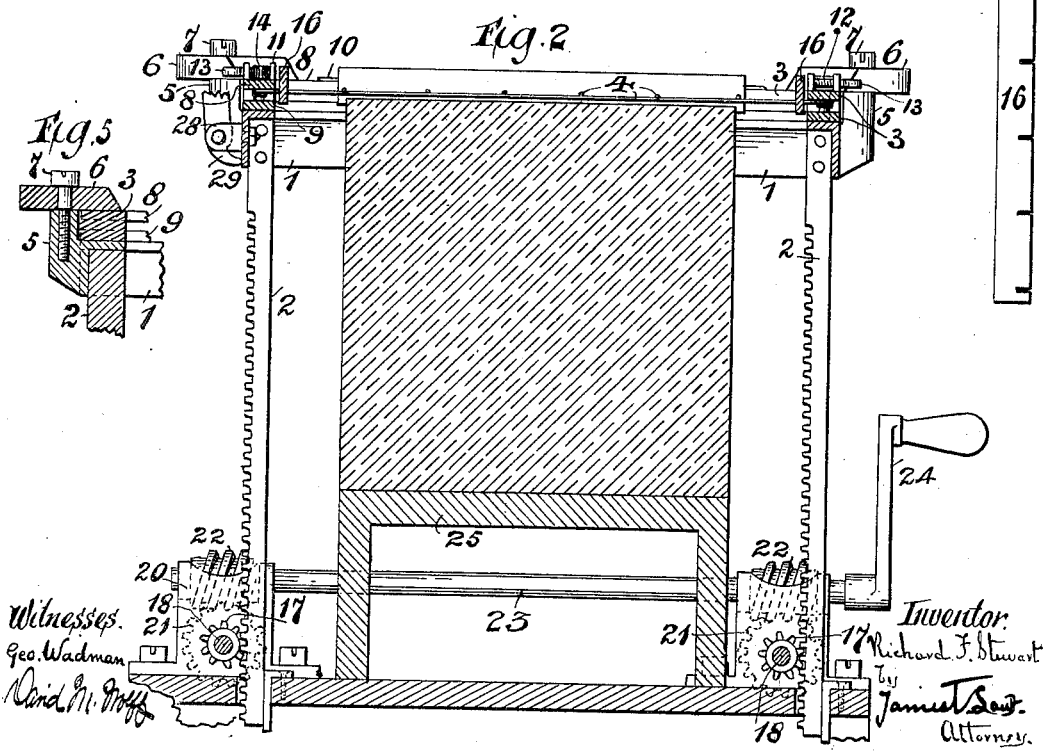
Witnesses.
Geo. Wadman
David M. Tripp
Inventor.
Richard F. Stewart
By James T. Dew
Attorney
THE NORRIS PETERS CO., PHOTO-LITHO., WASHINGTON, D. C.

No. 657,227. Patented Sept. 4, 1900.
R. F. STEWART.
BUTTER CUTTER.
(Application filed Nov. 22, 1899.)
(No Model.) 2 Sheets—Sheet 2.
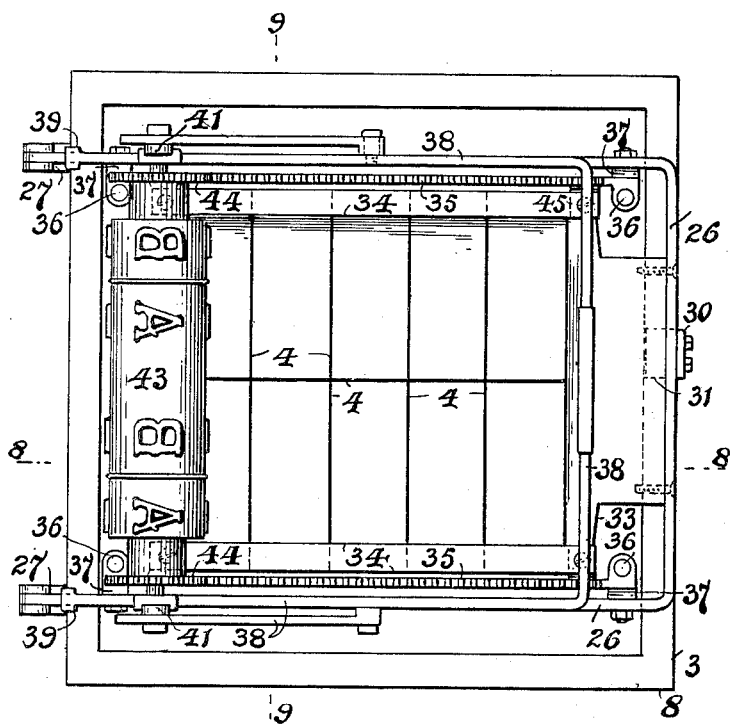
Fig. 7
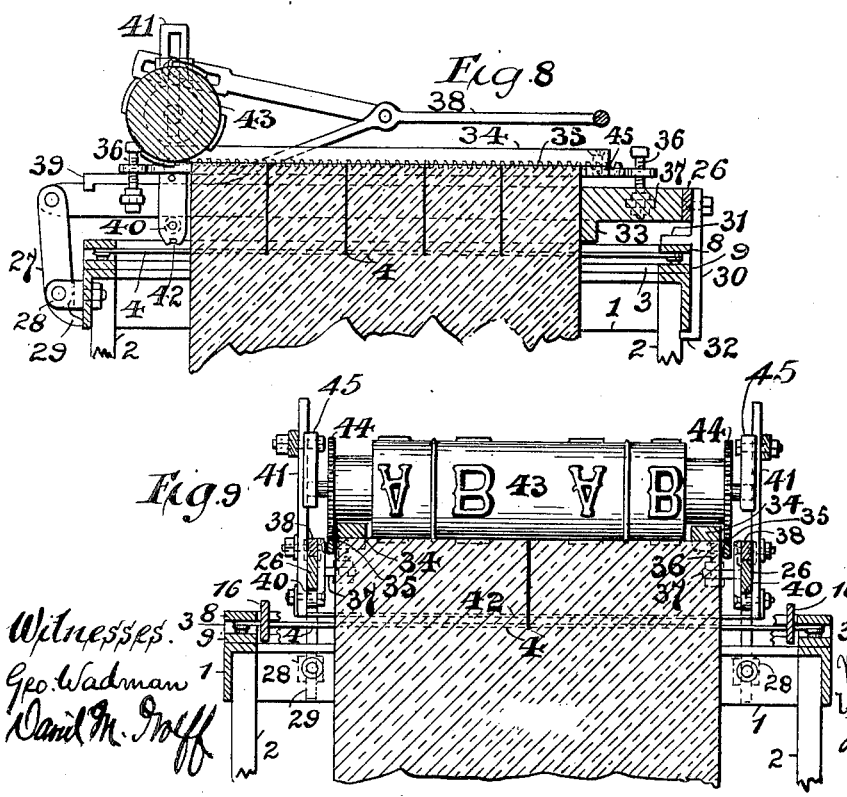
Fig. 8
Fig. 9
Witnesses.
Geo. Wadman
Daniel M. Wolff
Inventor.
Richard F. Stewart
by James T. Law.
Attorney.
THE NORRIS PETERS CO., PHOTO-LITHO., WASHINGTON, D. C.

UNITED STATES PATENT OFFICE.

RICHARD F. STEWART, OF MOUNT PLEASANT, NEW YORK.

BUTTER-CUTTER.

SPECIFICATION forming part of Letters Patent No. 657,227, dated September 4, 1900.

Application filed November 22, 1899. Serial No. 737,860. (No model.)

*To all whom it may concern:*

Be it known that I, RICHARD F. STEWART, a citizen of the United States of America, and a resident of Mount Pleasant, in the county of Westchester, State of New York, have invented certain new and useful Improvements in Butter-Cutters, of which the following is a specification.

In putting up butter in small packages for consumption it is very desirable that the butter shall be cut into the size block desired and not pressed into a form or mold, as by such pressing and consequent working over the fiber or grain of the butter is apt to be injured and the juice or water pressed out. This improvement relates to a cutting apparatus whereby butter can be cut into blocks or cakes of various sizes without being pressed or manipulated in any manner.

In the accompanying drawings, forming a part of this specification, Figure 1 is a top view of the cutting apparatus, showing the cutting-wires. Fig. 2 is a transverse sectional view of the same through the line $xx$, Fig. 1. Fig. 3 is a top view of one of the wire-stretching devices; and Fig. 4 is a vertical section of the same through the line $yy$, Fig. 3. Fig. 5 is a sectional view of the clamping device at the top of the frame through the line $zz$, Fig. 1. Fig. 6 is a side view of a wire-spacing bar. Fig. 7 is a top view of the apparatus, showing the horizontal cutter in place and ready to be operated. Fig. 8 is a vertical section of the same through the line 8 8, Fig. 7; and Fig. 9 is a transverse vertical section through the line 9 9, Fig. 7.

1 is a horizontal frame, preferably square, and formed of angle-iron to have the necessary lightness and strength, to the under side of which at the corners are secured four vertical rack-bars 2, by which the frame is supported and moved up and down.

3 is a second metallic frame of a shape and size to rest upon the top of the frame 1, to which the cutting-wires 4 are secured. The frame 3 fits within the corner-blocks 5 on the frame 1 and is held down upon and attached to the latter frame by the corner-buttons 6, fastened to the blocks 5 by the screw 7, whereby as the frame 1 is drawn down by the ratchet-bars 2 the frame 3, with the cutting-wires, is carried down with it. To detach the frame 3, it is only necessary to loosen the screws 6 and turn the buttons around, so that the frame can be lifted from the blocks 5.

The frame 3 consists of the top and bottom bars 8 9, integrally united at the corners, as shown in Fig. 5. On the upper surface of the bar 8 on the four sides of the frame are thin plates 10, secured by screws, to which are fixed lugs 11, Fig. 3, supporting worm-screws 12, provided with keys 13. These worm-screws engage with wheels 14, whose stems 15 are journaled in the bars 8 and 9. Around the stems 15, between the bars 8 and 9, are wrapped the ends of the cutting-wires 4, each end of each of the wires being secured to and wrapped around such stems 15 at the opposite sides of the frame, as shown in Fig. 1. As will be evident, when the worm-screws 12 are turned by their respective keys the wires will be further wrapped around the stems 15, and thus tightened. With this mechanism it is possible to draw the wires very taut and to hold them in this condition without their becoming loosened or slack as they are forced through the butter. Wooden gage-blocks 16 may be employed to space and maintain the wires the requisite distance apart. The cutting-wires may be arranged and spaced on the frame to cut blocks of any size and shape desired. When it is wished to change the shape or size of the block, another frame suitably arranged is sustituted for the first frame in the manner described above.

The frame 3, with the cutting-wires 4, secured on top of the frame 1 by the block 6, as above set forth, is drawn down by the rack-bars 2, attached to the four corners of the lower frame 1, which engage with cog-wheels 17, affixed to shafts 18, journaled in bearings 19 and 20 on two sides of the apparatus. At one end of the shafts 18 are gears 21, which engage with the worm-gears 22 on the cross-shaft 23, operated by the crank 24, whereby, as will be seen by the drawings, when the crank is turned the rack-bars 2 are drawn down together with the frames 1 and 3 with the cutting-wires.

The butter 24 to be cut is placed on a base or standard 25 in the center of the apparatus and below the wires where the frames 1 and 3 are raised in their uppermost position, as shown in Fig. 2. As the frames are carried down, as above described, the cutting-wires 4 are drawn down through the butter and cut the latter vertically into vertical strips or sections. The butter having been thus cut vertically, these vertical strips are next cut horizontally by the horizontal cutter into blocks. This horizontal cutter is shown in Figs. 7 to 9.

26 is a U-shaped frame pivoted to links 27, which are hinged to bifurcated lugs 28 on one side of the lower frame 1. The frame 26 can thus be raised and turned back against the wall or other support when the vertical cutter is being operated and can be turned down horizontally, so as to rest on the top of the block of butter resting on the base 25. On the lower ends of the links 27 are curved shanks 29, which act as stops when the frame is thrown back. From the front of the frame, at right angles thereto, extends a bar 30, having the inward projections 31 and 32. The projection 31 is so placed as to rest on top of the bar 8 of the frame 3 when the frame 26 is turned down in a horizontal position, and thereby furnish a support for the latter frame, while the projection 32 fits under the edge of the frame 1, the frame 26 admitting of a sufficient forward-and-backward movement for this purpose. The frame 26 is thus securely locked to the vertical frames 1 and 3 and is firmly held in a horizontal position during the operation of cutting the butter. On the under side of the frame 26 is a block 33, which when the frame is turned down on the block of butter rests against the front of the latter. On the sides of the top of the frame 26 are gages 34, on the outer edges of which are the side racks 35. These gages and racks are adjustably connected to the top of the frame by the screw-posts 36, turning in flanges 37 on the sides of the frame. By turning these posts in the proper direction the gage and rack are raised or lowered, according to the depth of the section of butter to be cut by the horizontal cutter, so that the gage and rack will always be on the top of the butter.

38 is a second U-shaped frame connected to and arranged to slide back and forth on the frame 26. On the back ends of the frame 38 are flanges 39, which embrace the top of the frame 26 and serve, together with the roller 40, to hold the frame 38 on the frame 26. The roller 40 is journaled in an upright 41, connected to the frame 38, secured to the bottom of which is the horizontal cutting-wire 42. As the roller 40 is so placed on the upright 41 as to press against and revolve on the bottom of the frame 26 and the flanges 39 embrace the top of the frame, the frame 38 is securely held on the frame 26 as it is moved back and forth on the latter. In the upper end of the upright 41 is adjustably journaled the printing-roller 43, on the outer ends of which are the pinions 44, which engage with the rack 35 and cause the roller to revolve. The roller is held in the slide-blocks 45 on the upright 41, whereby it may be raised or lowered to correspond with the adjustment of the rack by the screw-posts 36.

The operation of the cutter is as follows: The block of butter to be cut from the tub or box is placed on the platform or standard 25 under the frames 1 and 3. The crank 23 is then turned, drawing down the frames with the cutting-wires 4, cutting the block of butter into vertical strips or sections of the desired size. The horizontal cutting-frame 26 is then turned down on top of the butter and locked in position on the frames 1 and 3. The frame 38, having the cutting-wires 42, is then drawn across the butter, cutting the vertically-cut strips into the blocks or sections required, the block of butter as it is being severed by the horizontally-moving wire pressing against the block 33. The wire 42 passes close to the under side of this block 33, causing a shearing cut between the wire and block. In practice it is found more desirable to cut the butter vertically only to the depth desired for the severed section, cut this section or layer by the horizontal cutter, and then draw down the vertical cutters to the depth of another layer, and so on.

If desired, the vertical cutter or cutting-frames may be used by themselves and the blocks or cakes severed horizontally by any separate suitable device.

While I prefer the particular construction here shown and described, this construction may be varied without departing from the spirit of the invention.

What I claim is—

1. A butter-cutter comprising a vertically-moving frame carrying cutting-wires across its top, having mechanism by which the frame is drawn down on the butter, whereby the wires are caused to pass through the butter, and cut the latter into vertical strips, and a horizontally-moving frame, connected to and moving with the vertical cutting-frame, and carrying a cutting-wire, and arranged and adapted to be drawn across the block of butter and cut the latter, substantially as described.

2. In a butter-cutter, in combination, a vertically-moving frame, having cutting-wires across the top; mechanism by which the frame is drawn down whereby the wires are forced vertically through the butter; a horizontally-moving frame, having a cutting-wire, and arranged and adapted to be drawn across the vertically-moving frame whereby the butter is cut horizontally; and means by which the horizontally-moving frame is held on and secured to the vertically-moving frame, substantially as described.

3. In a butter-cutter, in combination, the vertically-moving frame 1, connected at each corner with the upright standards 2; detachable frame 3 provided with cutting-wires, and arranged to be secured to the frame 1; and mechanism whereby the standards 2 are drawn down with the frames 1 and 3, and the cutting-wires forced vertically through the butter, substantially as described.

4. In a butter-cutter, in combination, a vertically-moving frame; mechanism by which the frame is drawn down; a second frame detachably secured to the first frame, and provided with cutting-wires, whereby as the frame is drawn down, the wires are forced vertically through the butter; a horizontally-moving frame, provided with a cutting-wire, and arranged and adapted to be drawn across the vertically-moving frames, whereby the wire is forced horizontally through the butter; and means by which the horizontally-moving frame is held on and secured to the vertically-moving frames, substantially as described.

5. In a butter-cutter, in combination, the vertically-moving frame 1; the second frame 3; having the wires 4 secured thereto by the key-screws 12, whereby the wires are drawn tight across the frame; means by which the frame 3 is detachably secured to frame 1; mechanism connected to frame 1 whereby the frames are drawn down, and the wires 4 forced vertically through the butter; frame 26 hinged to frame 1 and arranged to rest horizontally on the latter frame, and frame 38, provided with the wire 42, and connected to and adapted to be drawn horizontally across the frame 26 whereby the wire 42 is forced in a horizontal direction through the butter, substantially as described.

RICHARD F. STEWART.

Witnesses:
LOUISE E. RYER,
DAVID M. WOLFF.